(12) United States Patent
Lee et al.

(10) Patent No.: US 11,089,434 B2
(45) Date of Patent: Aug. 10, 2021

(54) METHOD FOR TRANSMITTING AND RECEIVING REPORTS FOR RANGE ESTIMATION AND COMMUNICATION DEVICE THEREFOR

(71) Applicant: LG ELECTRONICS INC., Seoul (KR)

(72) Inventors: Sangrim Lee, Seoul (KR); Hojae Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/651,314

(22) PCT Filed: Sep. 27, 2018

(86) PCT No.: PCT/KR2018/011359
§ 371 (c)(1),
(2) Date: Mar. 26, 2020

(87) PCT Pub. No.: WO2019/066451
PCT Pub. Date: Apr. 4, 2019

(65) Prior Publication Data
US 2020/0236495 A1 Jul. 23, 2020

Related U.S. Application Data

(60) Provisional application No. 62/564,236, filed on Sep. 27, 2017.

(51) Int. Cl.
*H04W 4/02* (2018.01)
*H04W 24/08* (2009.01)

(52) U.S. Cl.
CPC .......... *H04W 4/023* (2013.01); *H04W 24/08* (2013.01)

(58) Field of Classification Search
CPC ...... H04B 17/364; H04B 7/06; H04B 17/318; H04W 24/08; H04W 4/023; H04W 4/02; H04W 7/0857
See application file for complete search history.

(56) References Cited

U.S. PATENT DOCUMENTS 10,116,359 B2 * 10/2018 Cao .................. H04B 7/066
10,779,280 B2 * 9/2020 Benjebbour ........ H04W 72/085
(Continued)

OTHER PUBLICATIONS

PCT International Application No. PCT/KR2018/011359, Written Opinion of the International Searching Authority dated Jan. 10, 2019, 21 pages.
(Continued)

*Primary Examiner* — Khawar Iqbal
(74) *Attorney, Agent, or Firm* — Lee Hong Degerman Kang Waimey

(57) ABSTRACT

A method for transmitting, by a user equipment, reports for range estimation may comprise the steps of: receiving a signal from each of a plurality of beams of a base station; calculating a time delay or a phase difference of a signal for each of the plurality of beams; and reporting, to the base station, beam index information indicating a corresponding beam with the smallest time delay or the smallest phase difference on the basis of the calculation. The user equipment is capable of communicating with at least one of another user equipment, a user equipment related to an autonomous driving vehicle, a base station or a network.

12 Claims, 9 Drawing Sheets

Subcarrier spacing = 15kHz

(56) References Cited

U.S. PATENT DOCUMENTS

| | | | | |
|---|---|---|---|---|
| 2014/0198681 A1* | 7/2014 | Jung | ................. | H04B 7/088 |
| | | | | 370/252 |
| 2015/0168554 A1* | 6/2015 | Aharoni | ................. | G01S 15/74 |
| | | | | 342/27 |
| 2017/0238297 A1* | 8/2017 | Benjebbour | ......... | H04B 7/0404 |
| | | | | 370/329 |
| 2017/0338874 A1* | 11/2017 | Pratt | ................. | H04B 7/10 |
| 2018/0241458 A1* | 8/2018 | Jung | ................. | H04B 7/0697 |
| 2018/0279134 A1* | 9/2018 | Malik | ................. | H04W 16/28 |
| 2019/0044583 A1* | 2/2019 | Garcia | ............. | H04W 72/0446 |
| 2019/0045460 A1* | 2/2019 | Muruganathan | ..... | H04B 7/0482 |
| 2019/0245639 A1* | 8/2019 | He | ................. | H04W 88/085 |
| 2019/0253108 A1* | 8/2019 | Zhang | ................. | H04B 7/0695 |
| 2020/0067585 A1* | 2/2020 | Subramanian | ......... | H04B 7/063 |
| 2020/0136705 A1* | 4/2020 | Li | ................. | H04B 7/0413 |
| 2020/0162133 A1* | 5/2020 | Harrison | ............. | H04L 5/0051 |
| 2020/0177265 A1* | 6/2020 | Guan | ............. | H04W 72/0453 |
| 2020/0220584 A1* | 7/2020 | John Wilson | ........ | H04B 7/0617 |
| 2020/0367083 A1* | 11/2020 | Hao | ................. | H04W 24/10 |
| 2020/0412422 A1* | 12/2020 | Park | ................. | H04B 7/0663 |

OTHER PUBLICATIONS

ZTE, "Discussion on DL beam management", 3GPP TSG RAN WG1 Meeting #89, R1-1707119, May 2017, 12 pages.

ITRI, "Discussion on beam measurement and reporting", 3GPP TSG RAN WG1 Meeting NR#3, R1-1715742, Sep. 2017, 3 pages.

QUALCOMM, "WF on Tone Spacing for RACH in Over-6 GHz", 3GPP TSG RAN WG1 Meeting #90. R1-1714839, Aug. 2017, 4 pages.

ZTE, et al., "Details and evaluation results on beam reporting", 3GPP TSG RAN WG1 Meeting NR#3, R1-1715444, Sep. 2017, 14 pages.

NTT DOCOMO, "Views on NR Beam Management", 3GPP TSG RAN WG1 Meeting NR#3, R1-1716082, Sep. 2017, 8 pages.

* cited by examiner

METHOD FOR TRANSMITTING AND RECEIVING REPORTS FOR RANGE ESTIMATION AND COMMUNICATION DEVICE THEREFOR

CROSS-REFERENCE TO RELATED APPLICATIONS

This application is the National Stage filing under 35 U.S.C. 371 of International Application No. PCT/KR2018/011359, filed on Sep. 27, 2018, which claims the benefit of U.S. Provisional Application No. 62/564,236 filed on Sep. 27, 2017, the contents of which are all hereby incorporated by reference herein in their entirety.

TECHNICAL FIELD

The present disclosure relates to wireless communications, and more particularly, to a method of transmitting and receiving a reporting for range estimation and communication apparatus therefor.

BACKGROUND ART

In the next generation 5G communication systems, a Wireless Sensor Network (WSN), a massive Machine Type Communication (MTC), etc., which intermittently transmit small packets by targeting a Massive Connection/Low cost/Low power Service, are considered.

In a massive MTC service, a connection density requirement is very limited but a data rate and an End-to-End (E2E) latency requirement are very free (e.g., Connection Density: UP to 200,000/km2, E2E Latency: Seconds to hours, DL DL/UL Data Rate: typically 1~100 Kbps).

DETAILED DESCRIPTION OF DISCLOSURE

Technical Tasks

One technical task of the present disclosure is to provide a method of transmitting a reporting for range estimation by a User Equipment (UE).

Another technical task of the present disclosure is to provide a method of receiving a reporting for range estimation by a Base Station (BS).

Further technical task of the present disclosure is to provide a user equipment transmitting a reporting for range estimation.

Another further technical task of the present disclosure is to provide a base station receiving a reporting for range estimation.

Technical tasks obtainable from the present invention are non-limited the above-mentioned technical task. Additionally, other unmentioned technical tasks can be clearly understood from the following description by those having ordinary skill in the technical field to which the present invention pertains.

Technical Solutions

According to one embodiment, a method of transmitting a reporting for range estimation by a user equipment may include receiving a signal from each of a plurality of beams of a base station, calculating a time delay or a phase difference of the signal per beam for a plurality of the beams, and reporting beam index information indicating a corresponding beam having a smallest time delay or a smallest phase difference to the base station based on the calculation. And, the reporting the beam index information may further include reporting a value of the smallest time delay or a value of the smallest phase difference.

The value of the smallest time delay or the value of the smallest phase difference may include a value of a quantized smallest time delay or a value of a quantized smallest phase difference. Each of a plurality of the beams may be received in a different time slot. Each of a plurality of the beams may be received in a different subband. The reporting method may be performed in an asynchronous state between the user equipment and the base station. The value of the smallest phase difference may be determined by considering a reference signal tone spacing on a frequency band per beam.

According to another embodiment, a method of receiving a reporting for range estimation by a base station may include transmitting a signal through each of a plurality of beams to a user equipment, receiving beam index information indicating a corresponding beam having a smallest time delay or a smallest phase difference and information on a value of the smallest time delay or a value of the smallest phase difference from the user equipment, and estimating a range or distance between the base station and the user equipment based on the value of the smallest time delay or the value of the smallest phase difference.

The value of the smallest time delay or the value of the smallest phase difference may include a value of a quantized smallest time delay or a value of a quantized smallest phase difference. The reporting receiving method may be performed in an asynchronous state between the user equipment and the base station. Each of a plurality of the beams may be received in a different time slot.

According to further embodiment, a user equipment transmitting a reporting for range estimation may include a receiver receiving a signal from each of a plurality of beams of a base station, a processor calculating a time delay or a phase difference of the signal per beam for a plurality of the beams, and a transmitter reporting beam index information indicating a corresponding beam having a smallest time delay or a smallest phase difference to the base station based on the calculation. The transmitter may further report a value of the smallest time delay or a value of the smallest phase difference.

According to another further embodiment, a base station receiving a reporting for range estimation may include a transmitter transmitting a signal through each of a plurality of beams to a user equipment, a receiver receiving beam index information indicating a corresponding beam having a smallest time delay or a smallest phase difference and information on a value of the smallest time delay or a value of the smallest phase difference from the user equipment, and a processor estimating a range or distance between the base station and the user equipment based on the value of the smallest time delay or the value of the smallest phase difference. The transmitter may transmit each of a plurality of the beams in a different time slot.

Advantageous Effects

According to an embodiment of the present disclosure, a method of transmitting a reporting for range estimation by a User Equipment (UE) may reduce and transmit feedback information efficiently.

According to an embodiment of the present disclosure, in case of performing range estimation based on feedback information reported from a user equipment in a situation asynchronous with the user equipment, a base station may decrease range estimation errors noticeably.

It will be appreciated by persons skilled in the art that the effects that can be achieved with the present disclosure are not limited to what has been particularly described hereinabove and other advantages of the present disclosure will be more clearly understood from the following detailed description taken in conjunction with the accompanying drawings. Namely, effects unintended in implementing the present disclosure will be derived from embodiments of the present disclosure by those skilled in the art.

DESCRIPTION OF DRAWINGS

The accompanying drawings, which are included to provide a further understanding of the disclosure, illustrate embodiments of the disclosure and together with the description serve to explain the principle of the disclosure.

BEST MODE FOR DISCLOSURE

Figure 1:
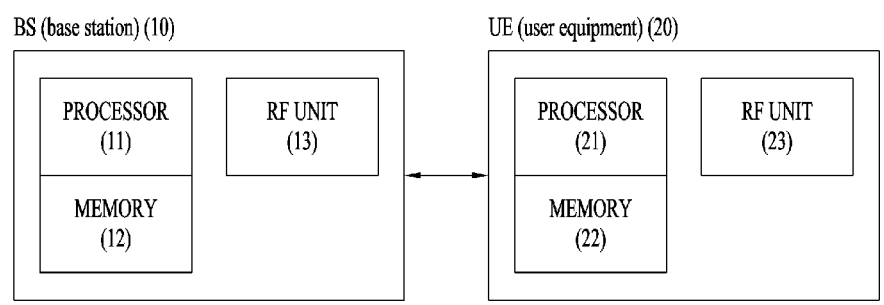
FIG. 1 is a diagram showing configurations of a base station 10 and a user equipment 20 in a wireless communication system 100.

Reference will now be made in detail to the preferred embodiments of the present invention, examples of which are illustrated in the accompanying drawings. In the following detailed description of the invention includes details to help the full understanding of the present invention. Yet, it is apparent to those skilled in the art that the present invention can be implemented without these details. For example, the following detailed description is specifically described assuming that the mobile communication system is 3GPP LTE/LTE-A or NR system, but is applicable to any other mobile communication system except for the specific features of 3GPP LTE/LTE-A.

Occasionally, to prevent the present disclosure from getting vaguer, structures and/or devices known to the public are skipped or can be represented as block diagrams centering on the core functions of the structures and/or devices. Wherever possible, the same reference numbers will be used throughout the drawings to refer to the same or like parts.

In addition, in the following description, it is assumed that a terminal is a mobile or fixed user stage device such as a User Equipment (UE), a Mobile Station (MS), an Advanced Mobile Station (AMS), and the like. Besides, it is assumed that a base station refers to any node of a network stage in communication with a terminal, such as a Node B, an eNode B, a Base Station (BS), an Access Point (AP), a gNode B (gNB), and the like.

In a mobile communication system, a user equipment is able to receive information in downlink and is able to transmit information in uplink as well. Information transmitted or received by the user equipment node may include various kinds of data and control information. In accordance with types and usages of the information transmitted or received by the user equipment, various physical channels may exist.

The following technologies may be used in a variety of wireless access systems, such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), and the like. CDMA may be implemented in a radio technology such as Universal Terrestrial Radio Access (UTRA) or CDMA2000. TDMA may be implemented in wireless technology such as Global System for Mobile Communications (GSM)/General Packet Radio Service (GPRS)/Enhanced Data Rates for GSM Evolution (EDGE). OFDMA may be implemented with wireless technology such as IEEE 802.11 (Wi-Fi), IEEE 802.16 (WiMAX), IEEE 802-20, Evolved UTRA (E-UTRA), and the like. UTRA is part of a Universal Mobile Telecommunications System (UMTS). $3^{rd}$ Generation Partnership Project (3GPP) Long Term Evolution (LTE) employs OFDMA in downlink as a part of an Evolved UMTS (E-UMTS) that uses E-UTRA and SC-FDMA in uplink. LTE-A (Advanced) is an evolved version of 3GPP LTE.

Moreover, in the following description, specific terminologies are provided to help the understanding of the present disclosure. And, the use of the specific terminology can be modified into another form within the scope of the technical idea of the present disclosure.

FIG. 1 is a diagram showing configurations of a base station 10 and a user equipment 20 in a wireless communication system 100.

Referring to FIG. 1, the wireless communication system includes a base station (BS) 10 and one or more UEs 20. The BS 10 may include a processor 11, a memory 12, and a Radio Frequency (RF) unit 13 (e.g., both a transmitter and a receiver included). The processor 11 may be configured to implement the proposed procedures and/or methods disclosed in the present application. The memory 12 is coupled to the processor 11 to store a variety of information for operating the processor 11. The RF unit 13 is coupled to the processor 11 to transmit and/or receive a radio signal. The UE 20 may include a processor 21, a memory 22, and an RF unit 23 (e.g., both a transmitter and a receiver included). The processor 21 may be configured to implement the proposed procedures and/or methods disclosed in the present application. The memory 22 is coupled to the processor 21 to store a variety of information for operating the processor 21. The RF unit 23 is coupled to the processor 21 to transmit and/or receive a radio signal. Each of the BS 10 and/or the UE 20 may have a single antenna or multiple antennas. When at least one of the BS 10 and the UE 20 has multiple antennas, the wireless communication system may be referred to as a Multiple Input Multiple Output (MIMO) system.

Each of the processors 11 and 21 may be referred to as a controller, a microcontroller, a microprocessor, a microcomputer, etc. In the meantime, the processor 11/21 may be implemented by various means, for example, hardware, firmware, software, or a combination thereof. In a hardware configuration, methods according to the embodiments of the present invention may be implemented by the processor 11/21, for example, one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In a firmware or software configuration, methods according to the embodiments of the present invention may be implemented in the form of modules, procedures, functions, etc. which perform the above-described functions or operations. Firmware or software implemented in the present invention may be contained in the processor 11/21 or the memory unit 12/22, such that it can be driven by the processor 11/21.

Layers of a radio interface protocol between the UE 20 and the BS 10 of the wireless communication system (network) may be classified into a first layer L1, a second layer L2, and a third layer L3, based on 3 lower layers of open systems interconnection (OSI) model well known in communication systems. A physical layer belongs to the first layer and provides an information transfer service via a physical channel. A radio resource control (RRC) layer belongs to the third layer and provides control radio resources between the UE and the network. The UE 10 and the BS 20 may exchange RRC messages with each other through the wireless communication network and the RRC layers.

In the present specification, while the processor 21 of the UE and the processor 11 of the BS perform operations of processing signals and data, except for a function of receiving and transmitting signals, performed respectively by the UE 20 and the BS 10, and a storage function, the processors 11 and 21 will not be particularly mentioned hereinbelow, for convenience of description. Although the processors 11 and 21 are not particularly mentioned, it may be appreciated that operations such as data processing other than signal reception or transmission may be performed by the processors 11 and 21.

In the present specification, range estimation may be determined as distance measurement (or estimation) in survey/positioning/radar fields, etc.

Relation Between Distance and Phase of Signal

A range is a factor affected mainly by hardware components and is less affected by PDOA that is the localization principle of a Radio Frequency IDentification (RFID) system. When localization is performed in PDOA unit, as a distance depends on a wavelength and start phase of a signal mainly emitted from an antenna, overflow is generated from the corresponding stage. This does not allow clear identification of an object in an ambiguous area. In case of a single antenna, a formula of calculating d according to a phase Φ is Equation 1.

$$d = \frac{\lambda}{2}\left(\frac{\phi}{2\pi} + n\right)$$ [Equation 1]

Here, d refers to a distance between a reader antenna and a tag, λ refers to a wavelength, Φ refers to a phase difference between a transmitted signal and a received signal, n is a positive integer, and a distance from a reader to a transponder is a multiple of λ/2 without a phase change. Although a phase is changed according to a distance, as a distance calculation can be represented as Formula 2, it is impossible due to Equation 2.

$$\phi = \phi_{int} + \phi_{prop}$$ [Equation 2]

Here, Φ refers to a phase of a signal. $\Phi_{int}$ refers to an internal phase of a tag. As Φprop is signal propagation, it refers to a phase. A parameter $\Phi_{int}$ is incalculable. Yet, if two kinds of different frequencies of a tag are used, a value of $\Phi_{int}$ is eliminated.

Phase-Difference-of-Arrival (PDOA) Based Range Estimation

A PDOA based access scheme shares the same concept of a dual frequency technology for range estimation applied to a radar system that uses a signal having two basic frequencies, and a phase difference observed from the two frequencies is used to estimate a range of a reflective object. Assume that an RFID reader transmits two Contiguous Waves (CWs) at the frequencies f1 and f2. Without considering the modulation performed on the RFID tag and receiver noise, a phase of an uplink signal at the frequency fi may be represented as $\phi_i = 4\pi f_i d/c_i$. Here, i=1, 2 and c=3×10$^8$ m/s indicates an RF signal propagation speed, and d refers to a range between a reader and a tag. Therefore, a range d may be estimated from a phase difference observed from a return signal corresponding to 2 frequencies. Actually, phase observation becomes a target of wrapping. Namely, a phase at each frequency is observable within a range of $0 \leq \phi_i < 2\pi$ only. Eventually, a tag range may be estimated as Equation 3.

$$\hat{d} = \frac{c\Delta\phi}{4\pi(f_2 - f_1)} + \frac{cm}{2(f_2 - f_1)}$$ [Equation 3]

Here, $0 \leq \Delta\phi = \phi_3 - \phi_1 < 2\pi$ is a wrapped phase difference observation, and m is an unknown integer. A second term of Equation 3 indicates range ambiguity due to topology. As backscattering modulation changes signal phases at two carrier frequencies in the same manner, Equation 3 is valid when the backscattering modulation is applied. The maximum non-ambiguous range is $d_{max} = c/2|f_2 - f_1|$.

Multi-Frequency Based Range Estimation

Range estimation performance of a PDOA method based on dual-frequency signaling may be difficult in other situations. One of the core restrictions is the balance between sensitivity of estimation on a maximally non-ambiguous range and sensitivity of estimation on a range for noise. Namely, although the great separation between two frequencies may reduce the sensitivity of range estimation on additional noise, if so, a small clear range that is not sufficiently large for an RFID system and application may be calculated. There is another problem. Namely, if a signal becomes seriously unclear at one or both of the two carrier frequencies, an unreliable phase is obtained. Subsequently, it is generated when a range is estimated from a received signal. If three or more carrier frequencies are used, such a problem can be overcome and the accuracy of a phase difference may be raised through proper data fusion on different frequency pairs. Eventually, estimation of a tag range may be enhanced. Since the different frequency pairs may possibly have various levels of a range estimation quality, it is preferable to have a weighted average of range communication rather than a simple average. Generally, there are 3 kinds of issues related to multi-frequency based range estimation, i.e., range estimation in a multi-frequency signaling system, selection of frequency and a weighted fusion of a range estimation value obtained from different frequency pairs.

Direction-of-Arrival (DOA) Estimation

There is one-to-one relation between received steering vectors associated with a direction of a signal. Thus, relation needs to be inverted possibly and estimation of a direction of a signal from a received signal needs to be possible. Therefore, an antenna array should provide DOA estimation. In addition, there is Fourier relation between a beam pattern and array. This allows a DOA estimation problem to be dealt with spectrum estimation equivalently.

Figure 2:
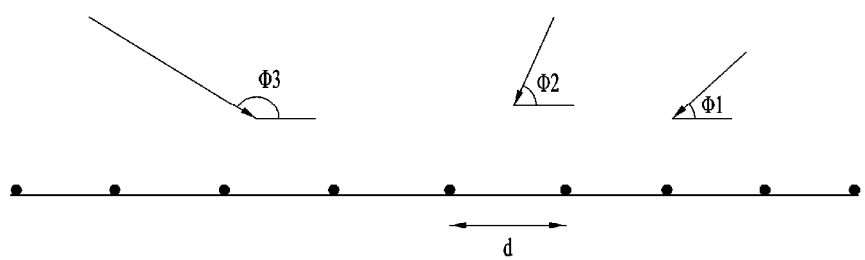
FIG. 2 is a diagram showing an example of a DOA estimation problem.

FIG. 2 is a diagram showing an example of a DOA estimation problem.

The issued problem is shown in FIG. 2. Several (M) signals collide with a linear equal interval array having N elements in direction $\Phi_i$. A goal of DOA estimation is to estimate $\Phi_i$, (where i=1 . . . M). Although it M<N in general, assume that an access scheme without such restriction condition (maximum-likelihood estimation, etc.) exists. Prediction is difficult due to a face that an unknown signal collides with an array in an unknown direction at an unknown amplitude. Moreover, a received signal is always damaged by noise. IT is able to estimate DOA using correlation, maximum likelihood, MUSIC, ESPRIT and Matrix Pencil.

The present disclosure proposes a method that enables a distance measurement in an asynchronous situation between network nodes on a network. Particularly, proposed is a scheme of range estimation using Transmission (Tx) beamforming. For example, the present disclosure proposes a scheme of range estimation using Tx beamforming of a base station. To reduce range estimation (distance estimation) error, it is important to secure a Line-Of-Sight (LOS) signal. In NR system, a base station may perform Tx beamforming based on relatively more antenna arrays and reduce range estimation error by adjusting a beam to enable a location of a UE and a beam direction to match each other maximally using the antenna array based Tx beamforming. Moreover, Angle of Departure (AoD) may be obtained from Tx beamforming.

The present disclosure proposes a reporting method of a UE for Tx beamforming based range estimation of a BS. Generally, in order to secure a quality of a beam link, the processor 21 of the UE measures Reference Signal Received Power (RSRP) per beam and the transmitter 23 of the UE may report a beam index corresponding to the greatest M among the measured RSRP values to the BS.

On the other hand, for ranging (or distance estimation), it is important to secure LOS. And, it is highly probable that a beam having a small delay among several beams matches a location of the UE. Hence, the processor 22 of the UE collects channel estimations (or first arrival of signals) for the respective beams. And, the transmitter 23 of the UE may report (or transmit) a beam index (value) having a smallest (i.e., a smallest delay among several beams) channel estimation (or a first arrival of signal) value for each beam and a delay value (or a first arrival of signal value) measured for the corresponding beam index to the BS.

A Tx beam index may have linkage with (i.e., be linked with) a time and/or frequency resource. Namely, the transmitter 23 of the UE may explicitly report a beam index to the BS. Or, the UE may deliver the linkage value as an implicit method. (For example, the linkage value may include a Resource Block (RB) index, a reference port number, a subframe number, etc.)

Figure 3:
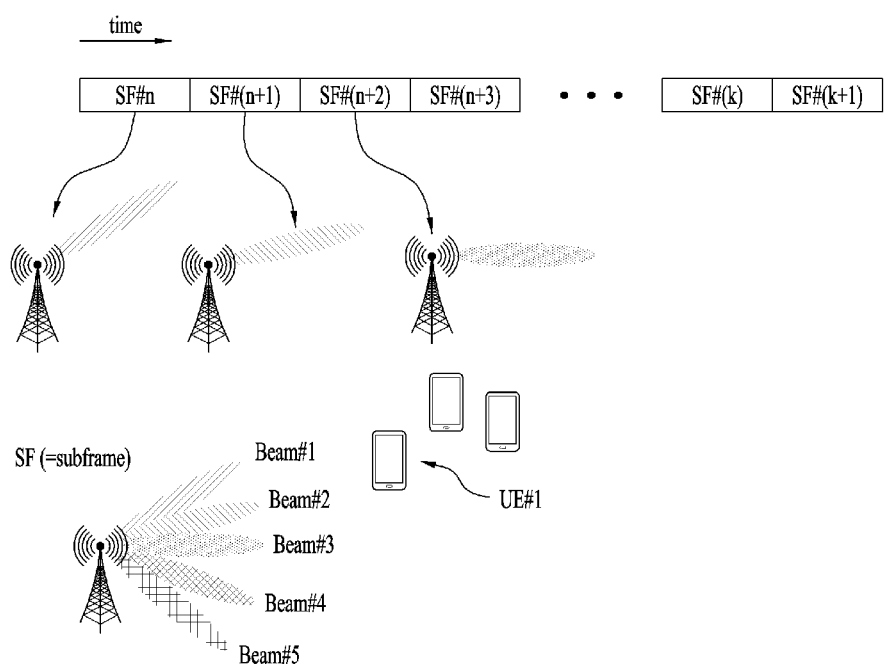
FIG. 3 is a diagram showing an example of Time-Of-Arrival (TOA) together with a time-based beamforming.
Figure 4:
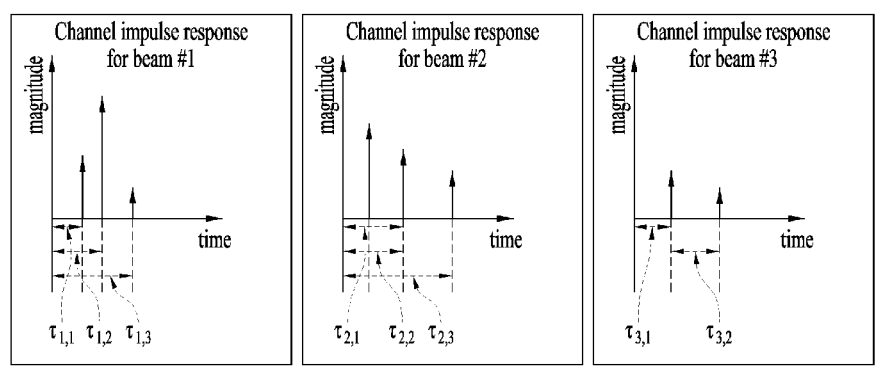
FIG. 4 is a diagram showing one example of channel estimation measured in a subframe.

FIG. 3 is a diagram showing an example of Time-Of-Arrival (TOA) together with a time-based beamforming, and FIG. 4 is a diagram showing one example of channel estimation measured in a subframe.

A time in a time-based beamforming may include a prescribed time interval such as a subframe, a symbol, a slot, etc. In FIG. 3, a beamforming is performed in subframe unit for example.

Referring to FIG. 3, the transmitter 13 of the BS may transmit a signal with a different beam per subframe. The transmitter 23 of the UE (e.g., UE #1 in FIG. 3) may report a delay value having a smallest delay among channel impulse responses of beams respectively corresponding to a beam index 1 (beam #1), a beam index 2 (beam #2) and a beam index 3 (beam #3) and a corresponding beam index to the BS. Referring to FIG. 4, the beam index having the smallest delay is 2 (i.e., beam index #2), and the transmitter 23 of the UE may quantize a value of $\tau_{2,1}$, which is the smallest delay value, and then report it to the BS. Consequently, it is highly probable that the beam #2 will be aligned with the UE. Moreover, information of Angle-of-Departure (AOD) may be obtained through the beam index reporting, which may be used for positioning.

Figure 5:
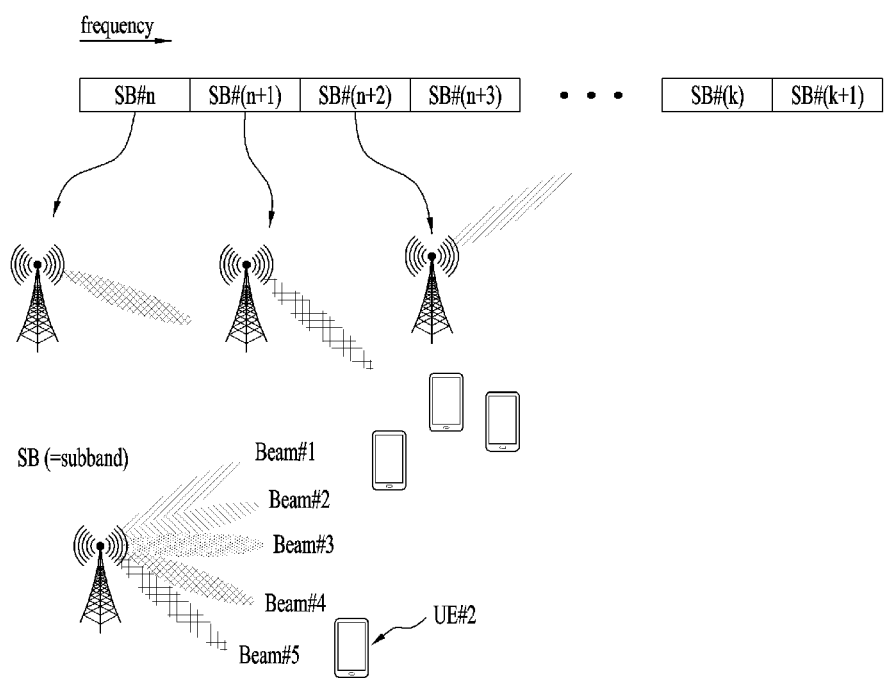
FIG. 5 is a diagram showing an example of Time-Of-Arrival (TOA) together with a frequency-based beamforming.
Figure 6:
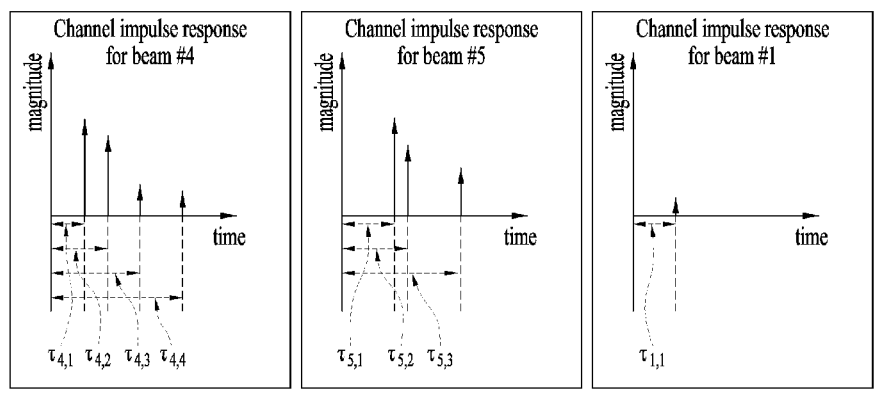
FIG. 6 is a diagram showing one example of channel estimation measured in SB unit.

FIG. 5 is a diagram showing an example of Time-Of-Arrival (TOA) together with a frequency-based beamforming, and FIG. 6 is a diagram showing one example of channel estimation measured in SB unit.

A frequency in a frequency-based beamforming may include a Resource Block (RB), a SubBand (SB), etc. FIG. 6 shows an example that a beamforming is performed in SB unit.

Referring to FIG. 5, the transmitter 23 of the UE (e.g., UE #2 in FIG. 5) may report a delay value having a smallest delay among channel impulse responses of a beam index 4 (beam #4), a beam index 5 (beam #5) and a beam index 1 (beam #1) and a corresponding beam index. In the example of FIG. 6, the beam having the smallest delay may correspond to the beam index 4. The processor 21 of the UE may quantize a value of $T_{4,1}$, which is the smallest delay value, and the transmitter 23 may report the quantized value to the BS. Consequently, it is highly probable that the beam #2 will be aligned with the UE.

In case of performing a time-based beamforming, a higher SNR may be obtained. Yet, if a channel is changed due to Doppler, performance may be degraded. On the other hand, in case of performing a frequency-based beamforming, acquisition time may be reduced but transmission power may be restricted.

PDOA with Same Tone Spacing (or Same Subcarrier Spacing) in Time- or Frequency-Based Beamforming PDOA method is identically applicable in the same manner of the ToA based reporting. Namely, the processor 21 of the UE may measure a phase difference per beam and control the transmitter 23 to report a beam index having a smallest phase difference and/or a phase difference value (e.g., a quantized value) to the BS. When the processor 21 of the UE measures the phase difference per beam, it may measure the phase difference in a manner of measuring an RS signal transmitted on 2 tones or subcarriers per beam.

Figure 7:
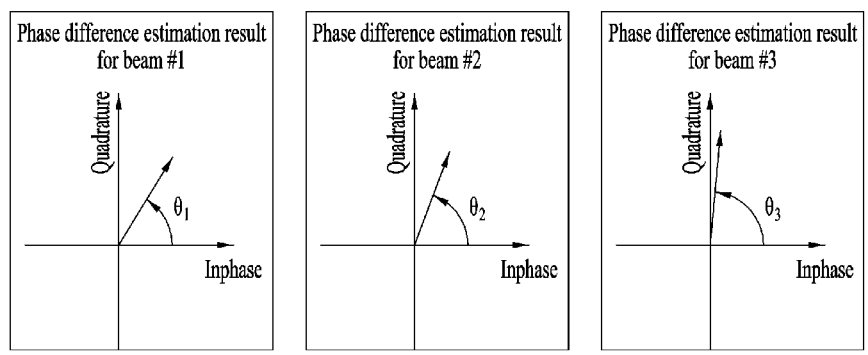
FIG. 7 is a diagram showing one example of a phase difference measured per beam.

FIG. 7 is a diagram showing one example of a phase difference measured per beam.

The transmitter 23 of the UE may report a beam index having a smallest phase difference among phase differences for the respective beams and a corresponding phase difference value to the BS. In the example shown in FIG. 7, the processor 21 of the UE quantizes the beam #1 and a value $\theta_1$ corresponding thereto, and the transmitter 23 may report the quantized value to the BS. Or, according to a reporting method, the processor 21 of the UE may modulate a phase difference and the transmitter 23 may transmit a signal of a modulated symbol to the BS.

PDOA with Different RS Tone Spacing (or, Multiple Times of Subcarrier Spacing)

In case of PDOA that uses 2 tones per beam, it may have a different RS tone spacing per beam. Information related to the RS tone spacing may be predefined per beam, or the transmitter 13 of the BS may broadcast the information related to the RS tone spacing as system information.

In case that an RS tone spacing is different per beam, the processor 21 of the UE may measure a phase difference per beam and then normalize it with a subcarrier spacing, and control the transmitter 23 to report a smallest value to the BS.

Figure 8:
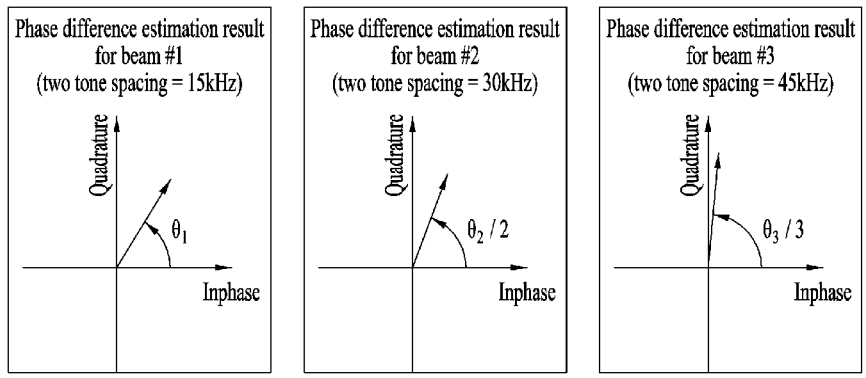
FIG. 8 is a diagram showing one example of normalizing a phase difference measured when 2 tone spacings per beam are different from each other.

FIG. 8 is a diagram showing one example of normalizing a phase difference measured when 2 tone spacings per beam are different from each other.

Referring to FIG. 8, the processor 21 of the UE finds a phase difference by normalizing a per-beam RS tone spacing by a subcarrier spacing rate and controls the transmitter 23 to report a smallest value among the phase differences to the BS. Namely, in case of a beam index 2 (beam #2), as a tone spacing of an RS and a subcarrier spacing are 30 kHz and 15 kHz, respectively, the processor 21 of the UE compares a value $\theta_2/2$ resulting from dividing the measured phase difference by 2 with phase difference values of other beam indexes. In case of a beam index 3 (beam #3), as a tone spacing of an RS and a subcarrier spacing are 45 kHz and 15 kHz, respectively, the processor 21 of the UE compares a value $\theta_3/3$ resulting from dividing the measured phase difference by 3 with phase difference values of other beam indexes. According to such comparisons, the processor 21 of the UE may control the transmitter 23 to report a beam index having a smallest phase difference and a value (e.g., a quantized value) for the smallest phase difference to the BS.

As described above, the processor 11 of the BS may obtain Angle of Departure (AoD) from the information reported to the UE and estimate a range or distance between the BS and the UE. In this case, in case of using the reported information of the UE, the processor 11 of the BS may noticeably reduce the error of the range estimation. And, the reported feedback amount may be reduced in comparison to the per-beam reporting method.

The above-described reporting transmitting method for the range estimation of the UE and the reporting receiving method for the range estimation of the BS are described schematically with reference to the accompanying drawing.

Figure 9:
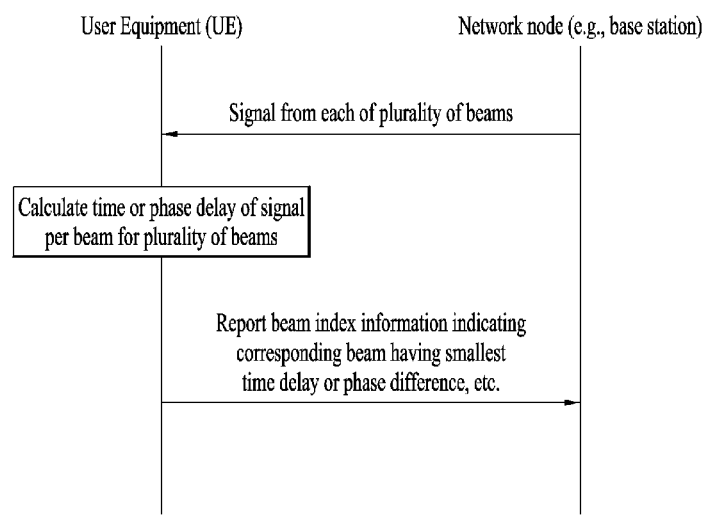
FIG. 9 is a diagram showing an example of a procedure for a method of transmitting a reporting for range estimation of a user equipment according to one embodiment of the present disclosure.

FIG. 9 is a diagram showing an example of a procedure for a method of transmitting a reporting for range estimation of a user equipment according to one embodiment of the present disclosure.

Referring to FIG. 9, the receiver 23 of the UE may receive a signal from each of a plurality of beams of the BS. The processor 21 of the UE may calculate a time delay or a phase difference of a signal for each of a plurality of the beams. Based on the calculation, the processor 21 of the UE may determine a corresponding beam having a smallest time delay or a smallest phase difference. The transmitter 23 may then report a beam index information indicating the determined corresponding beam to the BS.

Figure 10:
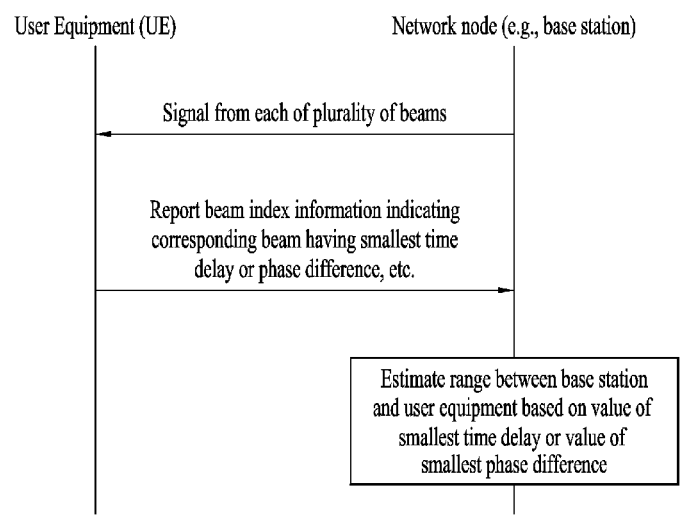
FIG. 10 is a diagram showing an example of a procedure for a method of transmitting a reporting for range estimation of a base station according to one embodiment of the present disclosure.

FIG. 10 is a diagram showing an example of a procedure for a method of transmitting a reporting for range estimation of a base station according to one embodiment of the present disclosure.

Referring to FIG. 10, the transmitter 13 of the BS may transmit a signal to the UE through each of a plurality of beams. The receiver 13 of the BS may receive beam index information indicating a corresponding beam having a smallest time delay or a smallest phase difference and information on a value of the smallest time delay or a value of the smallest phase difference from the UE. The processor 11 of the BS may estimate a range or distance between the BS and the UE based on the value of the smallest time delay or the value of the smallest phase difference. The processor 11 of the BS may obtain information on AOD as well based on the reported information.

The proposals and embodiments described above include combinations of components and features of the present disclosure in prescribed forms. In addition, the respective elements or features may be considered as selective unless they are explicitly mentioned. Each of the elements or features can be implemented in a form failing to be combined with other elements or features. Moreover, it is able to implement an embodiment of the present invention by combining elements and/or features together in part. A sequence of operations explained for each embodiment of the present invention can be modified. Some configurations or features of one embodiment can be included in another embodiment or can be substituted for corresponding configurations or features of another embodiment. In addition, it is apparently understandable that an embodiment is configured by combining claims failing to have relation of explicit citation in the appended claims together or can be included as new claims by amendment after filing an application.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

A method of transmitting and receiving a reporting for range estimation and communication apparatus therefor are industrially applicable to various wireless communication systems such as 5G communication system, etc.

What is claimed is:

1. A method of transmitting a reporting for range estimation by a user equipment, the method comprising:
receiving a signal from each of a plurality of beams of a base station;
calculating a phase difference of the signal per beam for a plurality of the beams; and
reporting beam index information indicating a corresponding beam with a normalized value of a smallest phase difference to the base station based on the calculation,
wherein the normalized value is determined by dividing a value of the smallest phase difference by an integer value, and wherein the integer value is determined by dividing a value of the reference signal tone spacing on a frequency band of the corresponding beam by a value of the subcarrier spacing on the frequency band of the corresponding beam.

2. The method of claim 1, wherein the value of the smallest phase difference comprises a value of a quantized smallest phase difference.

3. The method of claim 1, wherein each of a plurality of the beams is received in a different time slot.

4. The method of claim 1, wherein each of a plurality of the beams is received in a different subband.

5. The method of claim 1, wherein the reporting method is performed in an asynchronous state between the user equipment and the base station.

6. A method of receiving a reporting for range estimation by a base station, the method comprising:
transmitting a signal through each of a plurality of beams to a user equipment;
receiving beam index information indicating a corresponding beam with a normalized value of a smallest phase difference from the user equipment; and
estimating a range or distance between the base station and the user equipment based on the normalized value of the smallest phase difference,
wherein the normalized value is determined by dividing a value of the smallest phase difference by an integer value, and
wherein the integer value is determined by dividing a value of the reference signal tone spacing on a frequency band of the corresponding beam by a value of the subcarrier spacing on the frequency band of the corresponding beam.

7. The method of claim 6, the value of the smallest phase difference comprises a value of a quantized smallest phase difference.

8. The method of claim 6, wherein the reporting receiving method is performed in an asynchronous state between the user equipment and the base station.

9. The method of claim 6, wherein each of a plurality of the beams is received in a different time slot.

10. A user equipment transmitting a reporting for range estimation, the user equipment comprising:
a receiver receiving a signal from each of a plurality of beams of a base station;
a processor calculating a phase difference of the signal per beam for a plurality of the beams; and
a transmitter reporting beam index information indicating a corresponding beam with a normalized value of a smallest phase difference to the base station based on the calculation,
wherein the normalized value is determined by dividing a value of the smallest phase difference by an integer value, and
wherein the integer value is determined by dividing a value of the reference signal tone spacing on a frequency band of the corresponding beam by a value of the subcarrier spacing on the frequency band of the corresponding beam.

11. The user equipment of claim 10, wherein the user equipment is capable of communicating with at least one of another user equipment, a user equipment related to an autonomous driving vehicle, a base station or a network.

12. A base station receiving a reporting for range estimation, the base station comprising:
a transmitter transmitting a signal through each of a plurality of beams to a user equipment;
a receiver receiving beam index information indicating a corresponding beam with a normalized value of a smallest phase difference from the user equipment; and
a processor estimating a range or distance between the base station and the user equipment based on the normalized value of the smallest phase difference,
wherein the normalized value is determined by dividing a value of the smallest phase difference by an integer value, and
wherein the integer value is determined by dividing a value of the reference signal tone spacing on a frequency band of the corresponding beam by a value of the subcarrier spacing on the frequency band of the corresponding beam.

* * * * *